United States Patent [19]

Hagiwara

[11] Patent Number: 5,695,268

[45] Date of Patent: Dec. 9, 1997

[54] LIGHT SOURCE APPARATUS

[75] Inventor: Tsuneyuki Hagiwara, Kawasaki, Japan

[73] Assignee: Nikon Corporation, Tokyo, Japan

[21] Appl. No.: 618,373

[22] Filed: Mar. 19, 1996

[30] Foreign Application Priority Data

Jun. 12, 1995 [JP] Japan .................................. 7-144341

[51] Int. Cl.⁶ ............................................. F21V 9/14
[52] U.S. Cl. .................. 362/19; 362/293; 362/300; 362/343; 349/9; 359/487
[58] Field of Search ......................... 349/9; 359/487, 359/490, 494–497; 362/19, 300, 293, 343, 346

[56] References Cited

U.S. PATENT DOCUMENTS

| 5,200,843 | 4/1993 | Karasawa et al. ...................... 349/9 |
| 5,422,756 | 6/1995 | Weber .................................... 362/19 |

FOREIGN PATENT DOCUMENTS 597261  5/1994  European Pat. Off. .................... 349/9

OTHER PUBLICATIONS

"Flat Panel Display", Nikkei Micro Device, p. 217, Dec. 1993.

*Primary Examiner*—Alan Cariaso
*Attorney, Agent, or Firm*—Shapiro and Shapiro

[57] ABSTRACT

A light source apparatus for emitting rectilinear polarized light beams includes a light source unit, a polarizing filter unit for transmitting a first rectilinear polarized component among the light beams emitted from the light source unit but reflecting a second rectilinear polarized component and a light reflecting member for reflecting the second rectilinear polarized component in a direction of the polarizing filter unit and converting a direction of a polarization plane of the reflected second rectilinear polarized component into a direction of a polarization plane of the first rectilinear polarized component.

4 Claims, 8 Drawing Sheets

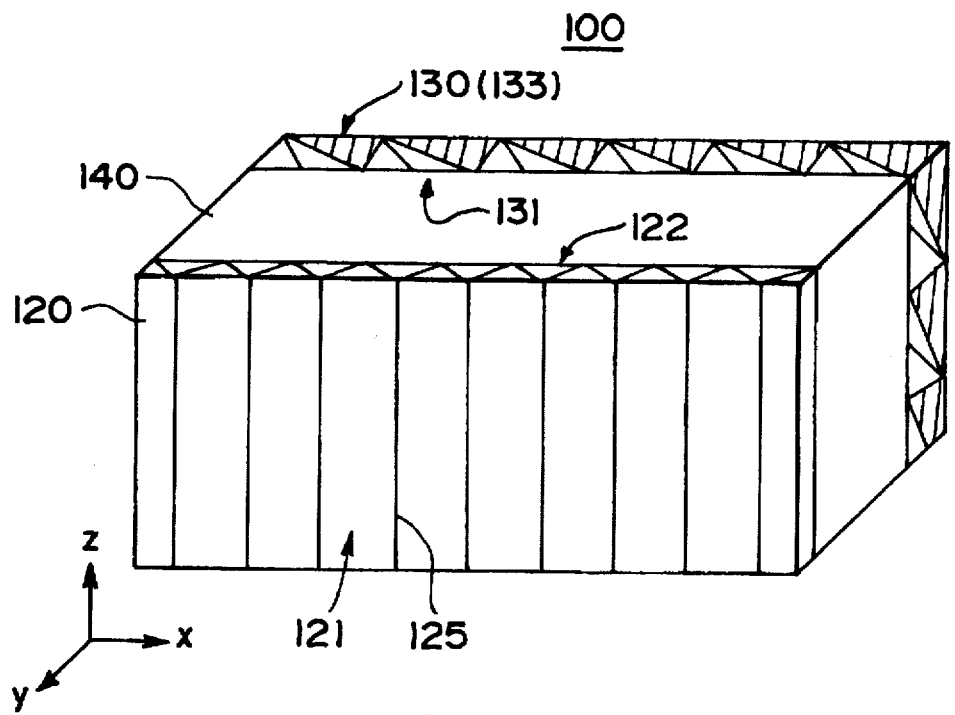
F I G. 1
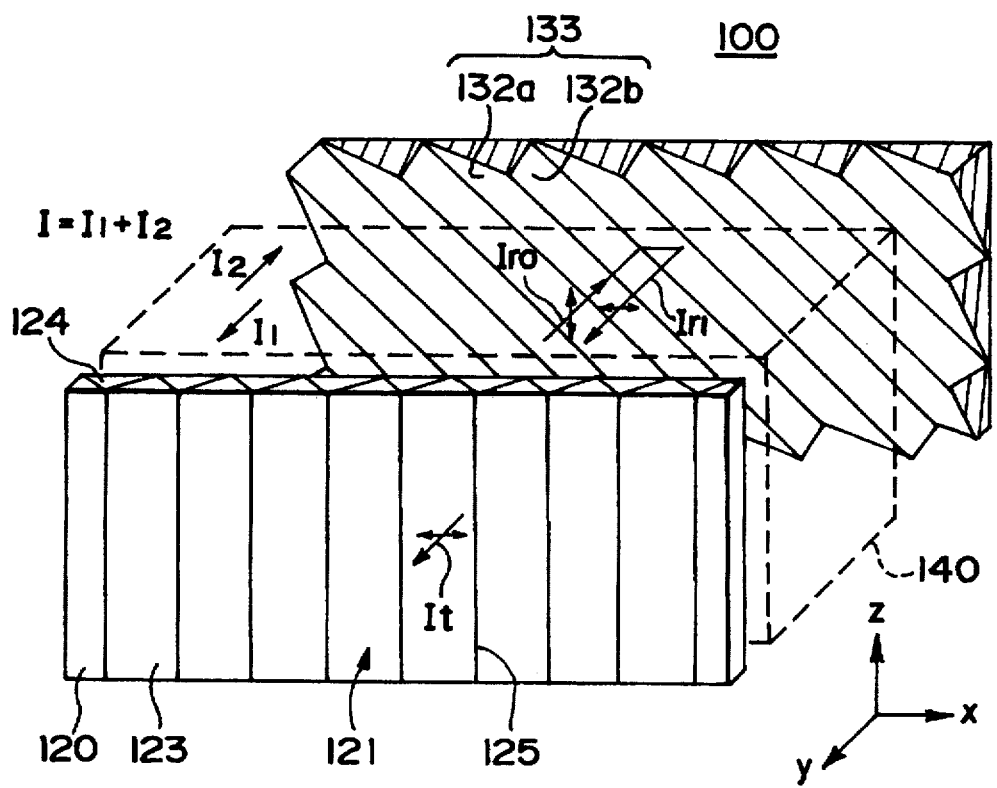
F I G. 2

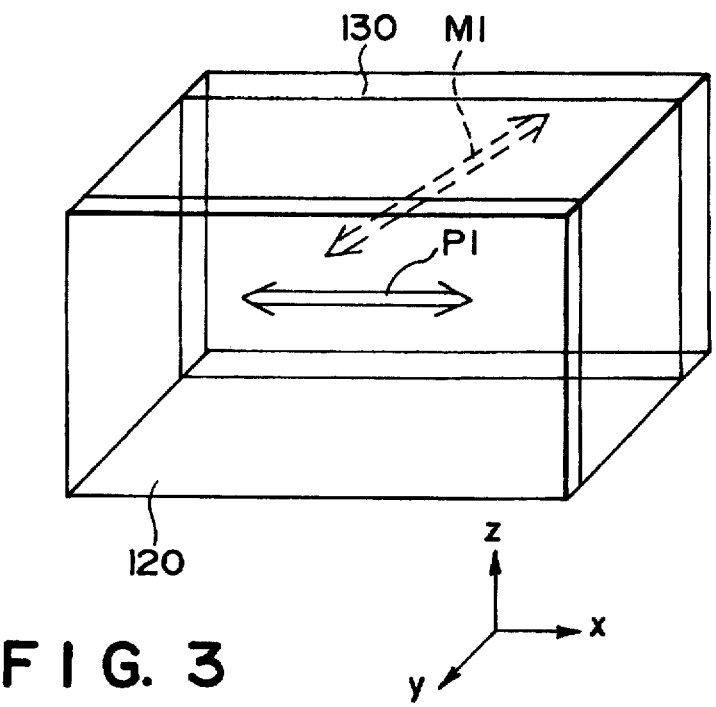
FIG. 3
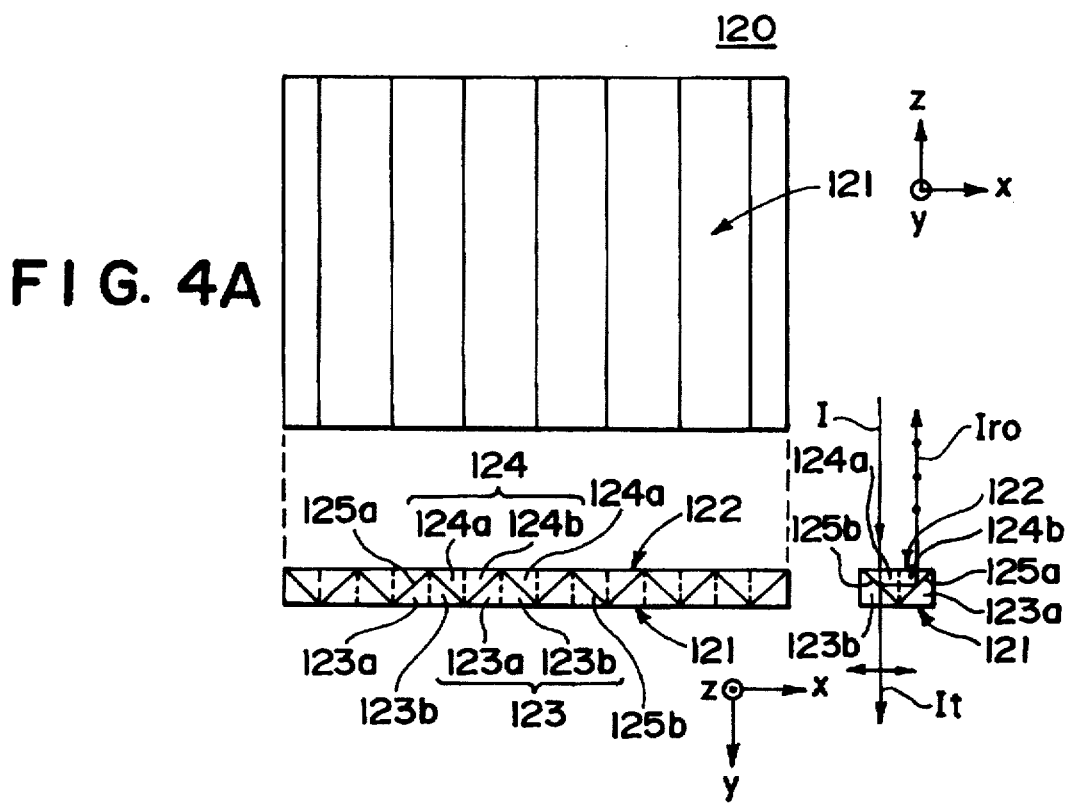
FIG. 4A
FIG. 4B    FIG. 4C

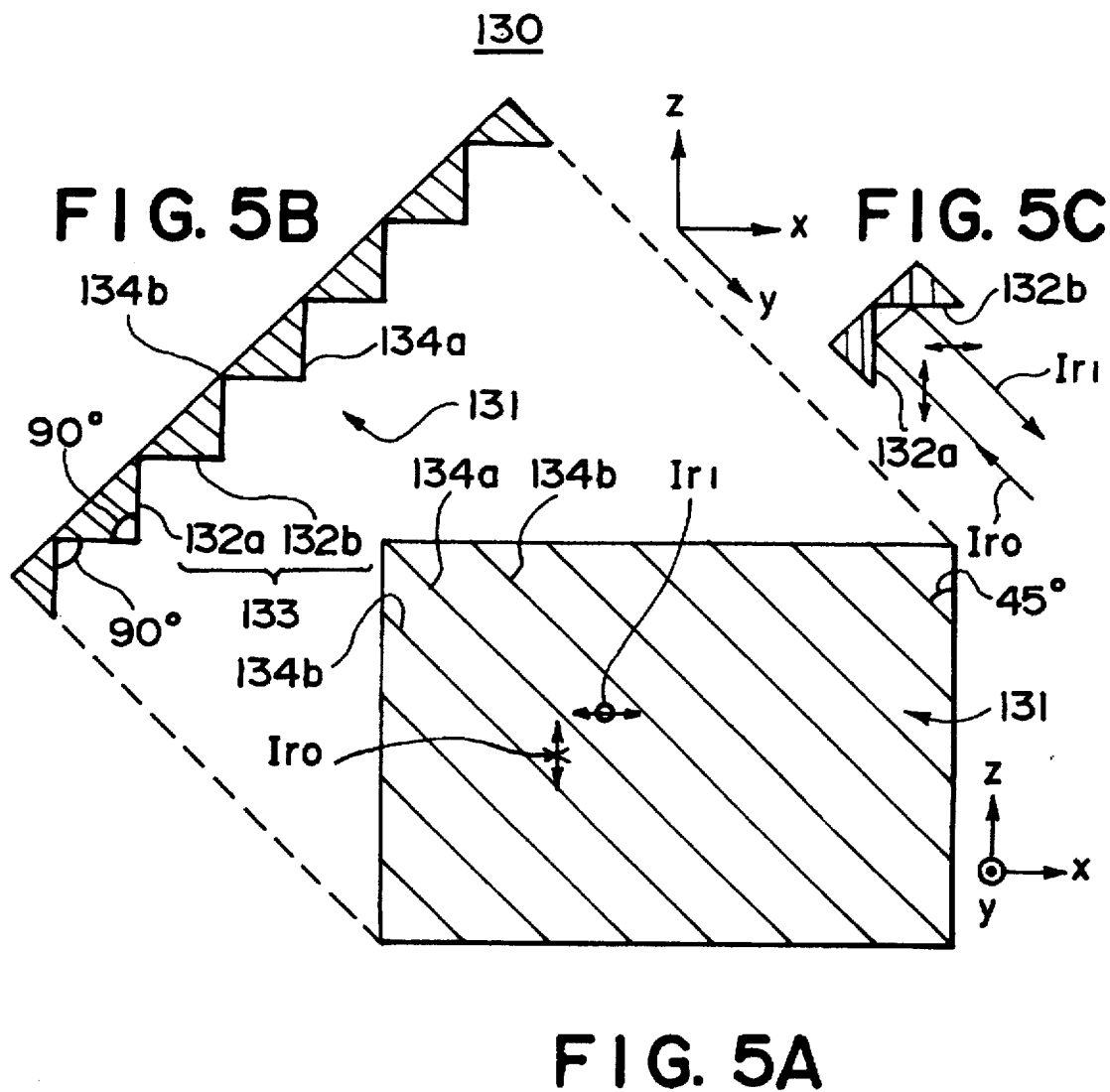

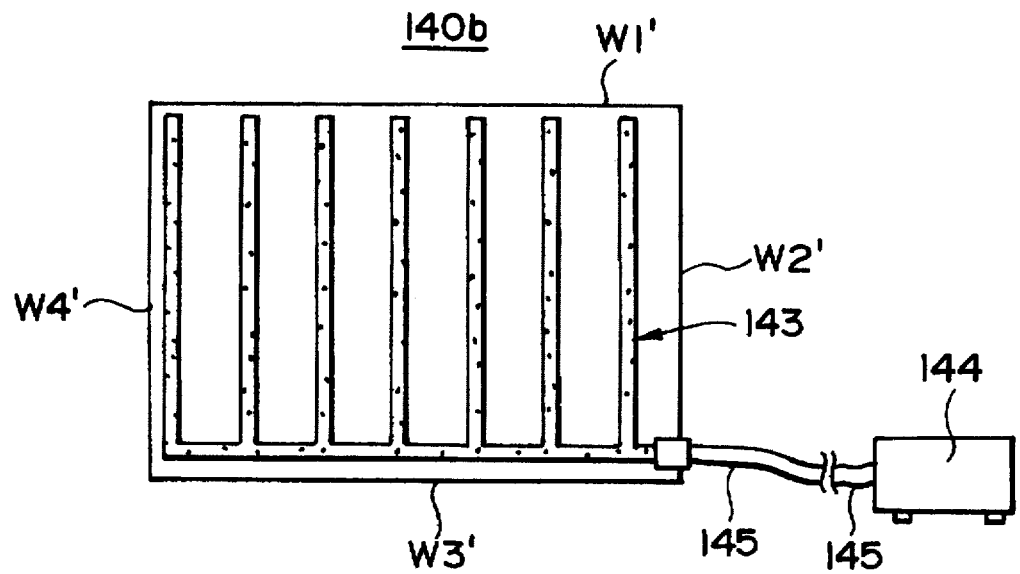
F I G. 8
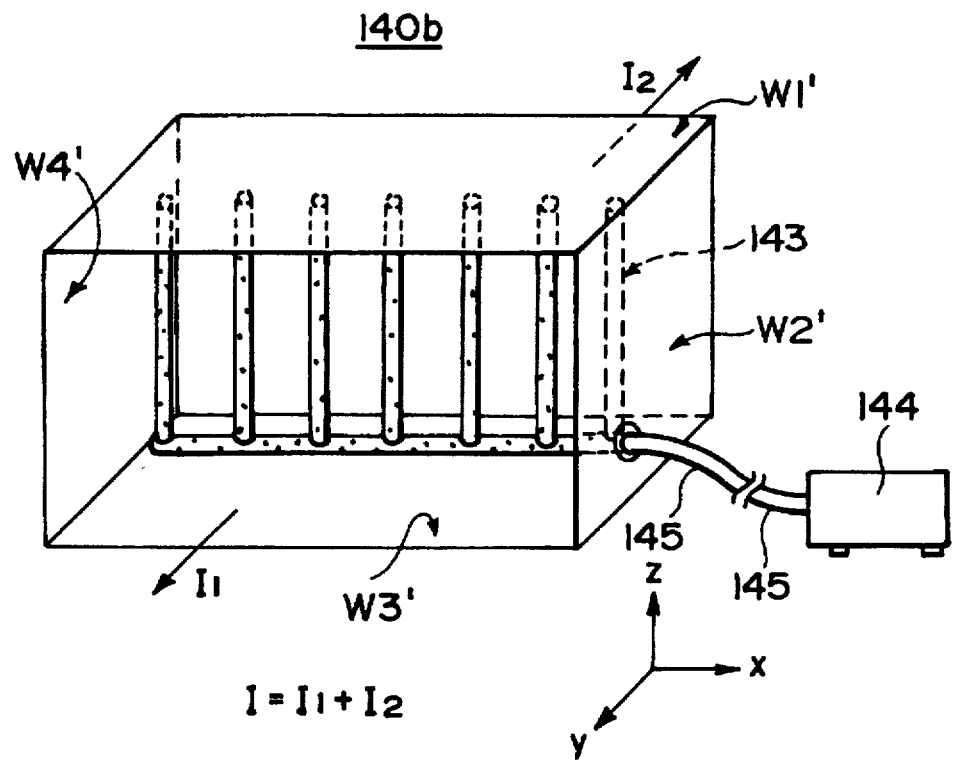
$I = I_1 + I_2$
F I G. 9

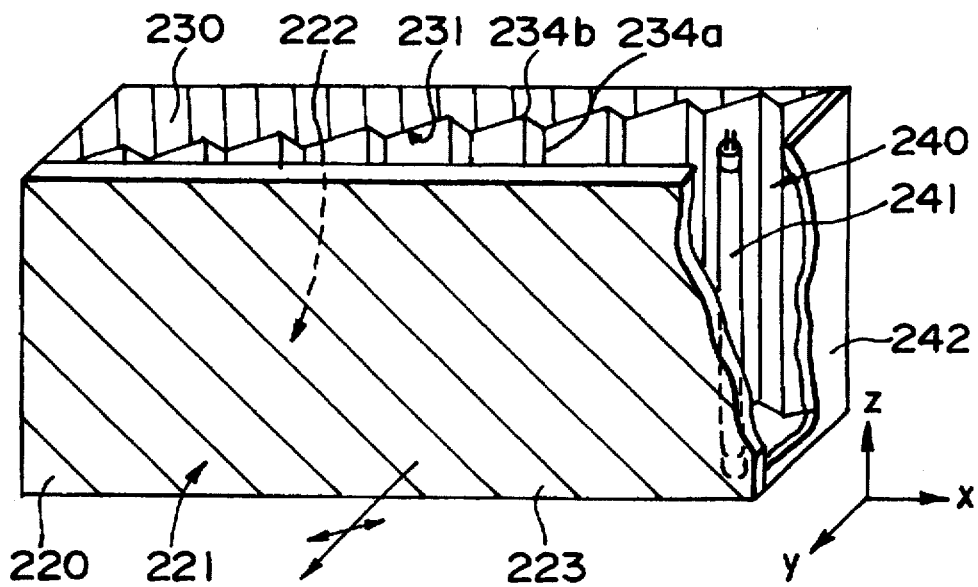
F I G. 10
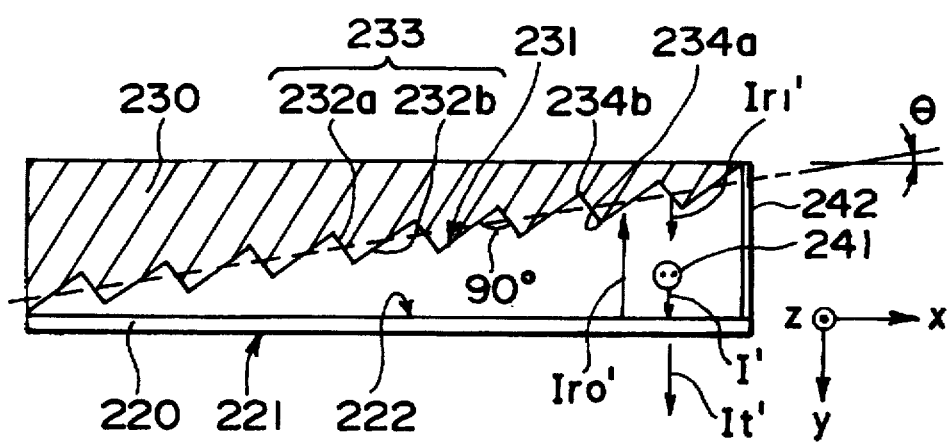
F I G. 11

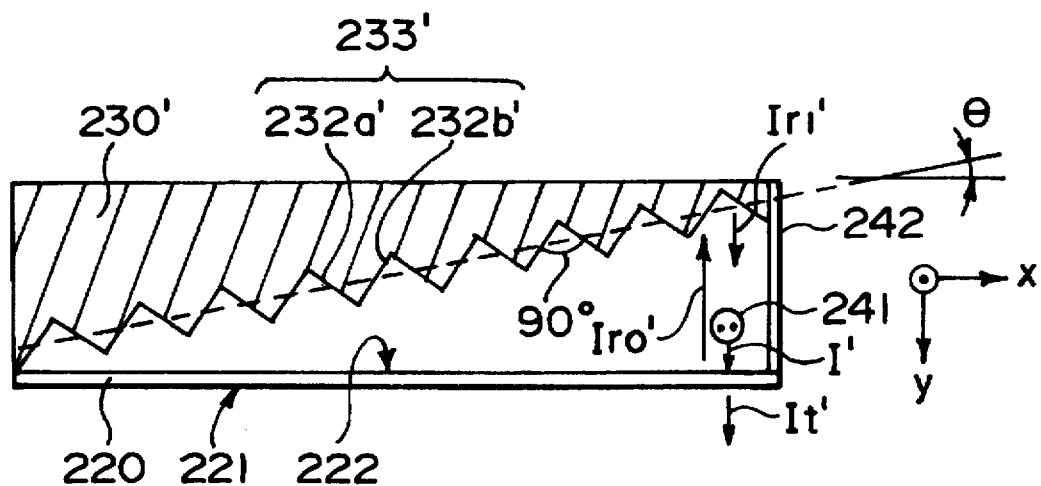
F I G. 12
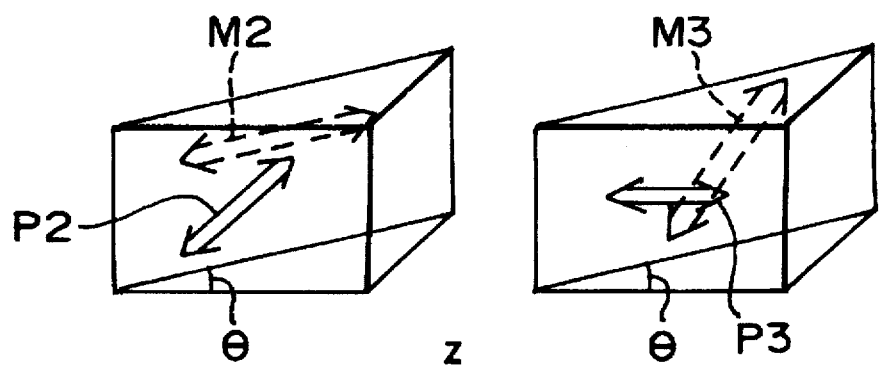
F I G. 13A    F I G. 13B
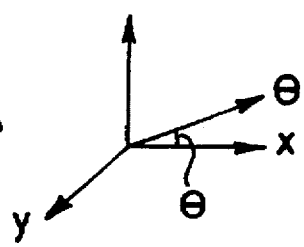

$I'' = I_0'' + I_1''$

LIGHT SOURCE APPARATUS

BACKGROUND OF THE INVENTION

1. Field of the Invention

The present invention relates generally to a light source apparatus and, more particularly, to a polarizing light source apparatus for emitting rectilinear polarized light beams suitable for back-light of a liquid crystal display device and a liquid crystal projector.

2. Related Background Art

In recent years, there has been demanded a development of a polarizing light source apparatus capable of emitting a large quantity of rectilinear polarized light beams as a back-light source for a large-sized liquid crystal display device and liquid crystal projector. In this respect, a light source apparatus constructed by combining a light source with a polarizing filter has hitherto been employed, wherein the polarizing filter takes only a one-directional rectilinear polarized component out of the light beams emitted from the light source such as a fluorescent lamp, and this rectilinear polarized component is emitted outside as a rectilinear polarized light beam.

In the above-described prior art polarizing light source apparatus, however, only the rectilinear polarized light beam having a polarization plane which passes through the polarizing filter among the light beams emitted from the light source has been utilized as illumination light, and the light components having other polarization planes are absorbed by the polarizing filter or confined within the light source but do not exit outside of the light source apparatus. Thus, the conventional apparatus has a low utilizing rate of the light beams from the light source and has no alternative but to increase in size.

SUMMARY OF THE INVENTION

It is a primary object of the present invention, which was contrived in view of the above problems inherent in prior art light source apparatuses, to provide a novel and improved light source apparatus capable of enhancing a utilizing rate of light beams from a light source and taking out a large quantity of rectilinear polarized light beams as illumination light.

To accomplish the above object, a light source apparatus according to the present invention can emit rectilinear polarized light beams. The same apparatus can also comprise a light source unit, a polarizing filter unit for transmitting a first rectilinear polarized component among the light beams emitted from the light source unit but reflecting a second rectilinear polarized component, and a light reflecting member for reflecting the second rectilinear polarized component in a direction of the polarizing filter unit and converting a direction (hereinafter termed a second rectilinear polarizing direction) of a polarization plane of the reflected second rectilinear polarized component into a direction (hereinafter termed a first polarizing direction) of a polarization plane of the first rectilinear polarized component.

The light reflecting member applicable to the above light source apparatus may be constructed by combining roof mirrors each having a vertical angle of, e.g., approximately 90°. In this case, respective crest and trough lines of the combination of the roof mirrors may be disposed to make an angle of approximately 45° to the polarizing direction of the second rectilinear polarized component. Alternatively, the light reflecting member may be constructed of a λ/4 wavelength plate and a light reflecting plate that are sequentially disposed perpendicularly to a traveling direction of the second rectilinear polarized component reflected by the polarizing filter unit.

The present invention being constructed as described above, as illustrated in FIGS. 1 and 2, the first rectilinear polarized component (It) having the first polarizing direction among the light beams (I) emitted from the light source unit (140) passes through the polarizing filter unit (120) and directly exits the light source apparatus (100) as a rectilinear polarized illumination light beam. In contrast with this, the second rectilinear polarized component having the second polarizing direction among the light beams (I) emitted from the light source unit (140) does not pass through the polarizing filter unit (120) but is reflected by this polarizing filter unit (120). Then, a polarizing direction of the second rectilinear polarized component (Ir0) reflected by the polarizing filter unit (120) is rotated through 90° by the light reflecting member (130), and this light beam is again reflected toward the polarizing filter unit (120) as the reflected light beam (Ir1) having the first polarizing direction. That is, the second rectilinear polarized component reflected by the light reflecting member (130) toward the polarizing filter unit (120) is converted into the first rectilinear polarized component and is therefore capable of penetrating the polarizing filter unit (120). Thus, according to the present invention, not only the first rectilinear polarized component but also the second rectilinear polarized component are utilized as the rectilinear polarized illumination light beams, and hence the utilizing rate of the light beams from the light source can be enhanced.

Referring to FIGS. 5B and 5C, there will be given an explanation of the operation in the case where the light reflecting member (130) is constructed by combining roof mirrors (hereinafter called a roof mirror assembly). A roof mirror assembly (133) is disposed to make a vertical angle of approximately 90°, and, therefore, it is possible to send back the light beam (Ir0) in an incident direction (Y-direction, this light beam (Ir0) having the second rectilinear polarized component being incident in a -Y-direction). Then, on this occasion, the polarizing plane of the incident light beam (Ir0) having an oscillating plane parallel to a Z-direction is rotated through 90° to the Z-direction when reflected from respective mirror surfaces (132a, 132b) of the roof mirror assembly (133), and this light beam is reflected in the Y-direction as the reflected light beam (Ir1) having the oscillating plane parallel to the X-direction. As a result, the incident light beam (Ir0) of the second rectilinear polarized light component having the oscillating plane parallel to the Z-direction is converted into the reflected light beam (Ir1) of the first rectilinear polarized component having the oscillating plane parallel to the X-direction and is therefore capable of passing through the polarizing filter unit (120).

Given next, referring to FIG. 15, is a description of the operation in the case where a light reflecting member (330) is composed of a λ/4 wavelength plate (332) and a plane mirror (334). Among light beams (I") emitted from a light source (340), a component (first rectilinear polarized component) having a polarization plane in the X-direction passes through a polarizing filter (320) and becomes a light beam (It"). In contrast with this, a component (second rectilinear polarized component) having the polarization plane in the Z-direction among the light beams (I") is reflected by the polarizing filter (320) and turns out a light beam (Ir0"). The light beam (Ir0") travels through the light source (340), when penetrating the λ/4 wavelength plate (332), undergoes a phase modulation and is converted into a right-turn circularly polarized light beam (Itr1). The circularly polarized light beam (Itr1) is reflected by the plane mirror (334) and converted into a left-turn circularly polarized light beam (Itr2). Then, the left-turn circularly polarized light beam (Itr2) undergoes, when passing through the λ/4 wavelength plate (332), the phase modulation once again and is converted into the rectilinear polarized light beam (Ir1") (first rectilinear polarized component). Therefore, the rectilinear polarized light beam (Ir1") passes through the polarizing filter (320) and exits outside.

The above and other objects, features and advantages of the present invention will be explained hereinafter and may be better understood by reference to the drawings and the descriptive matter which follows.

BRIEF DESCRIPTION OF THE DRAWINGS

FIG. 1 is a perspective view illustrating an outline of a light source apparatus in a first embodiment of the present invention;

FIG. 2 is a perspective view showing optical paths within the light source apparatus in the first embodiment of the present invention;

FIG. 3 is a schematic view showing configurations and a layout of a polarizing filter and a light reflecting member of the light source apparatus in the first embodiment of the present invention;

FIGS. 4A to 4C are explanatory views each schematically illustrating a configuration of the polarizing filter of the light source apparatus in the first embodiment of the present invention;

FIGS. 5A to 5C are explanatory views each schematically illustrating a configuration of the light reflecting member of the light source apparatus in the first embodiment of the present invention;

FIG. 8 is a plan view in a second mode of the light source unit of the light source apparatus of the present invention;

FIG. 9 is a perspective view in the second mode of the light source unit of the light apparatus of the present invention;

FIG. 10 is a perspective view schematically illustrating a construction of the light source apparatus in a second embodiment of the present invention;

FIG. 11 is a plan view schematically showing a first mode of a light reflecting member of the light source apparatus in the second embodiment of the present invention;

FIG. 12 is a plan view schematically showing a second mode of the light reflecting member of the light source apparatus in the second embodiment of the present invention;

FIGS. 13A and 13B are schematic views each showing configurations and a layout of the polarizing filter and the light reflecting member of the light source apparatus in a third embodiment of the present invention;

DETAILED DESCRIPTION OF THE PREFERRED EMBODIMENTS

Figure 6:
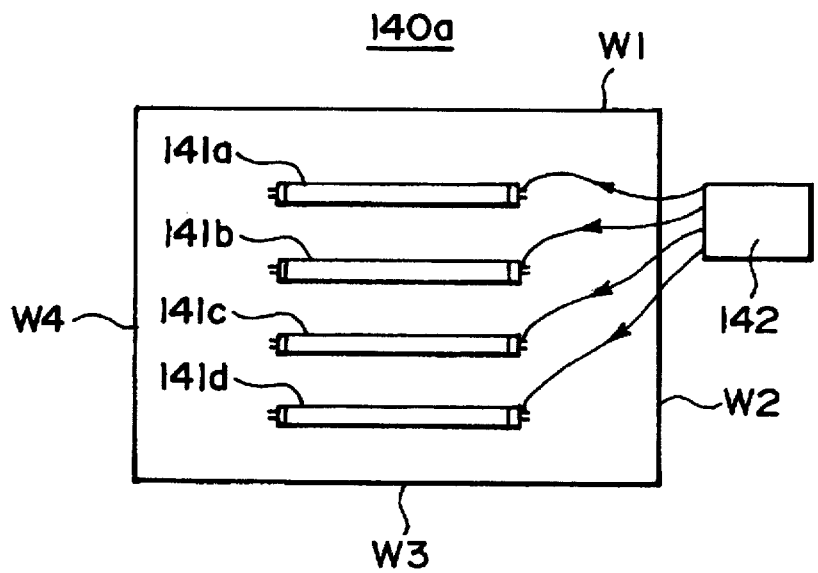
FIG. 6 is a plan view in a first mode of a light source unit of the light source apparatus of the present invention.

To start with, a light source apparatus 100 in accordance with a first embodiment of the present invention will hereinafter be described with reference to FIGS. 1 to 9. FIGS. 1 and 2 are perspective views schematically illustrating a configuration of the light source apparatus 100 in the first embodiment and optical paths within the apparatus. FIG. 3 illustrates configurations of a polarizing filter 120 and a light reflecting member 130 and a layout thereof. FIGS. 4A to 4C and FIGS. 5A to 5C schematically illustrate the configurations of the polarizing filter 120 and the light reflecting member 130 that are employed in the light source apparatus 100. Further, FIGS. 6 to 9 schematically show a light source unit 140 used in the light source apparatus 100.

As depicted in the perspective view of FIG. 1, the light source apparatus 100 in the first embodiment is constructed mainly of the polarizing filter 120, a light reflecting member 130 and a light source unit 140. A light transmitting surface 121 of the polarizing filter 120 and a light reflecting surface 131 of the light reflecting member 130 respectively expand on an X-Z plane (or plane parallel to the X-Z plane) shown in FIG. 1. A light reflecting surface 122 (rear surface of the light transmitting surface 121) of the polarizing filter 120 and a light reflecting surface 131 of the light reflecting member 130 are in a face-to-face relationship with the light source unit 140 interposed therebetween. Note that rectilinearly polarized illumination light may emerge from the light transmitting surface 121 of the polarizing filter 120 in the light source apparatus 100, and hence other surfaces may be formed so as not to cause a light leak by covering those surfaces with a wall member having, e.g., a rear mirror finished surface.

Next, an outline of the configuration of the polarizing filter 120 will be explained with reference to FIGS. 4A to 4C. FIG. 4A is a plan view of the polarizing filter 120 as viewed from the side of the light transmitting surface 121. FIG. 4B is a side view of the polarizing filter 120 as viewed from above of the drawing sheet surface. FIG. 4C is an explanatory view illustrating optical paths within the polarizing filter 120.

As shown in FIG. 4B, the polarizing filter 120 is constructed in a tabular shape by combining a plurality of prism groups 123, 124 each assuming a shape of substantially triangular pole. The light transmitting surface 121 is formed by one side surface of the prism group 123, while the light reflecting surface 122 is formed by one side surface of the prism group 124. It is to be noted that the prism group 123 is composed of polarizing beam splitters 123a, 123b each assuming the shape of substantially triangular pole. The prism group 124 is composed of light transmitting members 124a, 124b each taking a substantially triangular shape. Accordingly, a first boundary surface 125a is formed on a contact surface between the polarizing beam splitter 123a and the light transmitting member 124b. A second boundary surface 125b is formed on a contact surface between the polarizing beam splitter 123b and the light transmitting member 124a. Then, in accordance with this embodiment, the substantially-triangularly-shaped prism groups 123, 124 are disposed in a side-by-side relationship in the X-direction (indicated by solid-line arrow P1 on the X-Z plane (or the plane parallel to the X-Z plane in FIG. 3) so that respective ridge lines 125 (FIG. 2) thereof face in the perpendicular direction (Z-direction).

With such a construction, as illustrated in FIG. 4C, the light beam It (first rectilinear polarized component) having the oscillating plane (polarization plane) parallel to the X-direction among the light beams I incident on the light reflecting surface 122 from the Y-direction can penetrate the first and second boundary surfaces 125a, 125b and emerge as rectilinear polarized beam in the Y-direction from the light transmitting surface 121. While on the other hand, the light beam Ir0 (second rectilinear polarized component) having the oscillating plane parallel to the Z-direction among the light beams I incident on the light reflecting surface 122 from the Y-direction is reflected by the first and second boundary surfaces 125b, 125aa and travel back in a direction (−Y-direction) where the same beam comes from the light reflecting surface 122. Thus, the polarizing filter 120 functions to polarization-split the light beams I at the first and second boundary surfaces 125a, 125b, transmit the light beam It (first rectilinear polarized component) and reflect the light beam Ir0 (second rectilinear polarized component).

Next, a first embodiment of the light reflecting member 130 capable of changing the polarizing direction of the light beam will be explained with reference to FIGS. 5A to 5C. FIG. 5A is a plan view of the light reflecting member 130 as viewed from the side of the light reflecting surface 131. FIG. 5B is a view of the light reflecting member 130 as viewed from above but obliquely leftward. FIG. 5C is an explanatory view showing the optical path of the light beam incident on the light reflecting member 130.

As illustrated in FIG. 5B, the light reflecting member 130 is constructed as a roof mirror assembly 133 by assembling mirrors 132a, 132b in a crest-and-trough shape to make a vertical angle of approximately 90°. On this occasion, a crest line 134a and a trough line 134b formed at a boundary between the mirrors 132a, 132b are, as shown in FIG. 5A, disposed to make an angle of 45° to the polarizing direction (Z-direction) of the light beam Ir0 (second rectilinear polarized component) reflected from the polarizing filter 120. That is, in the embodiment of FIG. 1, the roof mirror assembly 133 is, as indicated by a dotted-line arrow M1 in FIG. 3, disposed in the side-by-side relationship along a straight line with an inclination of 1 on the X-Z plane (or the plane parallel to the X-Z plane). Note that if the light reflecting member 130 is composed as a resinous roof mirror, the light source apparatus 100 can be reduced in weight.

The optical path for light beams reflected by the light reflecting member 130 as constructed above will be explained with reference to FIG. 5C.

At first, the light reflecting member 130 according to the present invention is disposed by way of the roof mirror assembly 133 having the vertical angle of approximately 90° and therefore functions as a corner mirror. The light reflecting member 130 is also capable of sending a light beam Ir0 (second rectilinear polarized component) back in the Y-direction, this light beam Ir0 having been incident in the −Y-direction. Then, at that time, the incident beam Ir0 having an oscillating plane parallel to the Z-direction is, when the polarizing surface rotates through 90° in the Z-direction on the occasion of reflections from respective mirror surfaces 132a, 132b of the roof mirror assembly 133, reflected in the Y-direction as a reflected beam Ir1 having the oscillating plane parallel to the X-direction. As a result, the incident beam Ir0 (second rectilinear polarized component) having the oscillating plane parallel to the Z-direction is converted into the reflected beam Ir1 (first rectilinear polarized component) having the oscillating surface parallel to the X-direction.

As described above, according to the light source apparatus 100 in the first embodiment of the present invention, a light beam It containing the first rectilinear polarized component (oscillating plane parallel to the X-direction) among the light beams I emitted from the light source unit 140, as illustrated in FIG. 2, directly penetrates the polarizing filter 120 and exits outward as a rectilinear polarized beam. Further, the light beam Ir0 containing the second rectilinear polarized component (oscillating plane parallel to the Z-direction) reflected by the polarizing filter 120 is also converted into the light beam Ir1 containing the first rectilinear polarized component (oscillating plane parallel to the X-direction) when reflected by the reflecting member 130 and is therefore capable of passing through the polarizing filter 120. Accordingly, as compared with the prior art light source apparatus wherein it transmits only the first rectilinear polarized component, and a light utilizing efficiency can be remarkably enhanced.

Incidentally, as in the embodiment discussed above, if it is desired that the rectilinear polarized beam It including a polarization-plane parallel to the X-direction be obtained, as illustrated in FIG. 3, the prism group 123 constituting a polarizing beam splitter of the polarizing filter 120 is disposed in the side-by-side relationship in the X-direction (indicated by the solid arrow P1) on the X-Z plane (or the plane parallel to the X-Z plane). Also, the mirror assembly 133 of the light reflecting member 130 is disposed in the side-by-side relationship to make an angle of approximately 45° to the side-by-side-disposed direction of the prism group 123, i.e., disposed in the straight-line direction with an inclination of 1 on the X-Z plane (or the plane parallel to the X-Z plane), thus attaining the acquisition of the rectilinear polarized beam It. The present invention is not, however, limited to such an embodiment, and it is possible to obtain the rectilinear polarized light beam having the polarization plane in a desired direction by properly adjusting the translational direction P1 of the prism group 123 and the translational direction M1 of the mirror assembly 133.

The thus constructed light source apparatus 100 can be employed with combination with a variety of light source units 140. Next, modes of the light source unit 140, which are applicable to the light source apparatus 100, will be explained with reference to FIGS. 6 to 9.

Figure 7:
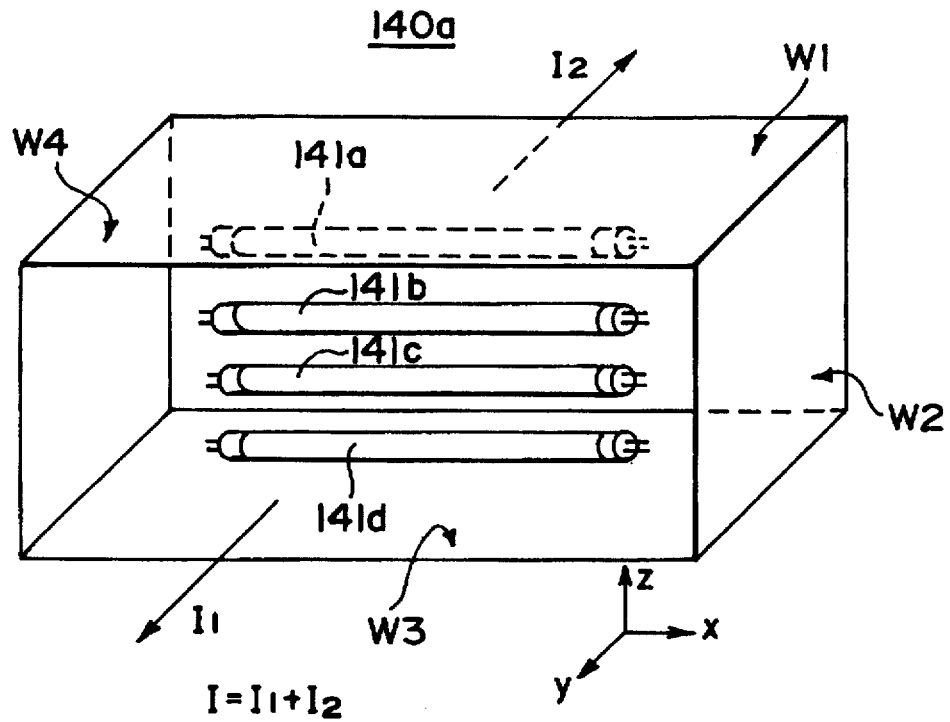
FIG. 7 is a perspective view in the first mode of the light source unit of the light source apparatus of the present invention.

FIGS. 6 and 7 illustrate a first mode 140a of the light source unit 140. FIG. 6 is a plan view of the first light source unit 140a as viewed from the side of the light transmitting surface of the polarizing filter 120. FIG. 7 is a perspective view schematically showing a configuration of the first light source unit 140a.

As illustrated in FIGS. 6 and 7, the first light Source unit 140a includes four lengths of rod-like fluorescent lamps 141a–141d installed in a substantially rectangular space defined by side walls W1–W4. The first light source unit 140a is capable of radiating ±Y-directional apertures with the light beams (I=I1+I2) (i.e., toward the light reflecting member 130 (in the -Y-direction) as well as toward the polarizing filter 120 (in the Y-direction)). Internal surfaces of the side walls W1–W4 are formed as reflecting surfaces enough to efficiently use the light beams emitted from the fluorescent lamps 141a–141d. Further, an outside power supply 142 is connected to the fluorescent lamps 141a–141d. The fluorescent lamps 141a–141d can be lit up with a supply of the electric current from this outside power supply 142. Note that the embodiment illustrated in FIGS. 6 and 7 is one embodiment of the light source making use of the fluorescent lamps. Shapes and the number of fluorescent lamps or configurations of the side walls are not, however, limited to those in the above-discussed embodiment. As a matter of course, they can be changed and modified in a variety of ways.

FIGS. 8 and 9 illustrate a second mode 140b of the light source unit 140. FIG. 8 is a plan view of the second light source unit 140b as viewed from the side of the light transmitting surface of the polarizing filter 120. FIG. 9 is a perspective view schematically showing a configuration of the second light source unit 140b.

As illustrated in FIGS. 8 and 9, the second light source unit 140b includes a comb-like light scattering member 143 installed in a substantially rectangular space defined by side walls W1'-W4'. The second light source unit 140b is capable of radiating the ±Y-directional apertures with the light beams (I=I1+I2) (i.e., toward the light reflecting member 130 (in the -Y-direction) as well as toward the polarizing filter 120 (in the Y-direction)). As in the first light source unit 140a, internal surfaces of the side walls W1'-W4' are formed as reflecting surfaces enough to efficiently use the light beams emitted from the light scattering member 143.

The light scattering member 143 may be constructed by roughly finishing a surface of, e.g., light transmissive plastic such as acrylic resin by sandblasting or by sandblasting a glass surface. The comb-like light scattering member 143 is supplied with an optical energy through a light transmission element such as an optical fiber 145 from a lamp house 144 housed with a halogen lamp or the like. Scattered light beams are radiated from the ±Y-directional apertures of the light scattering member 143. Note that the comb-like light scattering member has been used as the light scattering member 143 in the illustrative embodiment, but this member 143 may, without being confined to such a configuration, take a variety of shapes, e.g., a tabular shape.

As discussed above, the light source adopted for the light source apparatus 100 according to the present invention may be capable of efficiently supplying the light beams to the light reflecting surface of the light reflecting member 130 as well as to the light transmitting surface 121 of the polarizing filter 120. It is possible to supply a desired quantity of light over a wide areal range by use of light sources 140a, 140b as shown in FIGS. 6 to 9. Then, as already explained, according to the present invention, the light beam It of the first rectilinear polarized component among the light beams I supplied from the light sources 140a, 140b directly passes through the polarizing filter 120. The light beam Ir0 of the second rectilinear polarized component among those light beams I is also changed into the light beam Ir1 of the first rectilinear polarized component by the light reflecting member 130 and is therefore capable of penetrating the polarizing filter 120.

Referring to FIGS. 10 to 13B, there will next be given a discussion on a second embodiment wherein the light reflecting member is constructed of the roof mirror assembly as in the first embodiment shown in FIG. 1. FIG. 10 is a perspective view schematically illustrating a construction of the second embodiment. FIGS. 11 and 12 respectively illustrate first and second modes of the light reflecting member applicable to the embodiment of FIG. 10. FIGS. 13A and 13B are explanatory views schematically illustrating a side-by-side-disposed direction of the prisms and the reflecting surfaces in the embodiment of FIG. 10.

As depicted in FIG. 10, a light source apparatus 200 in the second embodiment is, as in the embodiment shown in FIGS. 1 and 2, constructed mainly of a polarizing filter 220, light reflecting member 230 and a light source unit 240. Basic functions of the members constituting the polarizing filter 220, the light reflecting member 230 and the light source unit 240 are the same as those in the light source apparatus illustrated in FIGS. 1 and 2. In the preceding first embodiment, however, the light source unit 140 comprises the light emitting unit for irradiating the whole light transmitting surface 121 (light reflecting surface 122) and the whole light reflecting surface 131 with the light beams. In contrast with this, the light source unit 240 is constructed of a fluorescent lamp 241 installed on one side.(+X-directional side) of the light source apparatus 200 and an X-directional side wall 242 with its internal surface formed as a reflecting surface in accordance with this embodiment. With this construction, the light emitting unit is provided sideways of the apparatus, and the light beams therefrom spread over the whole of the light transmitting surface 221 (light reflecting surface 222) and the light reflecting surface 231 by making use of the light reflection. That is, in this embodiment, as illustrated in FIG. 11, the light reflecting surface 231 of the light reflecting member 230 is installed with a tilt of an angle as small as θ to the light transmitting surface 221 (light reflecting surface 222) of the polarizing filter 220. Accordingly, the light beams emitted from the fluorescent lamp 241 are repeatedly reflected between the light reflecting surfaces 222, 231 and thus can reach the other side (-X-directional side) of the light source apparatus 200.

Note that the ridge lines of a plurality of substantially-triangularly-shaped prisms 223 composed of polarizing beam splitters are, unlike the first embodiment, inclined (from upper left side to lower right side on the drawing sheet surface) at approximately 45° to the X-direction in the second embodiment illustrated in FIG. 10. Further, a roof mirror assembly 233 formed of mirror surfaces 232a, 232b are disposed so that a crest line 234a and a trough line 234b defined as boundary lines between the mirror surfaces 232a, 232b face in the substantially perpendicular direction (Z-direction). Thus, in the second embodiment shown in FIG. 10 as well as in the first embodiment shown in FIG. 1, the side-by-side-disposed direction of the prism of the polarizing filter is opposite to the side-by-side-disposed direction of the roof mirror of the light reflecting member. It is, however, feasible to obtain excellent effects of the present invention as exhibited by converting the second rectilinear polarized component into the first rectilinear polarized component with any construction.

The operation of the second embodiment illustrated in FIG. 10 will be briefly described with reference to FIG. 11. In accordance with the second embodiment, a rectilinearly polarized light beam It' (first rectilinear polarized component) having a polarization plane in a 45° direction to the X-direction among light beams I' emitted from the fluorescent lamp 241 directly penetrates the polarizing filter 220 and exits the light transmitting surface 221. In contrast with this, among the light beams emitted from the fluorescent lamp 241, a rectilinearly polarized light beam Ir0' (second rectilinear polarized component) having the polarization plane orthogonal to the light beam It' is reflected by the light reflecting surface 222 of the polarizing filter 220 and then travels toward the light reflecting member 230. Then, when the light beam Ir0' is reflected by mirrors 232a, 232b of the light reflecting member 230, a polarizing direction rotates through 90°. Subsequently, the light beam Ir0' is incident on the polarizing filter 220 as a light beam Ir1' (first rectilinear polarized component) having the same polarization plane as that of the light beam It' and it penetrates the polarizing filter 220 together with the light beam It' and exits the light transmitting surface 221 as a rectilinear polarized beam. Thus, the light beam I' emitted from the fluorescent lamp 241 is repeatedly reflected between the polarizing filter 220 and the light reflecting member 230 and, in the meanwhile, converted into the polarized beam (first rectilinear polarized component) capable of passing through the polarizing filter 220. The processed light from light beam I' then penetrates the polarizing filter 220 and exists as the rectilinear polarized beam.

Note that the light reflecting member 230 (roof mirror assembly 233) illustrated in FIG. 11 is constructed so that the respective mirror surfaces 232a, 232b make a 45° angle to the X-direction. Besides, the light reflecting member 230 is disposed so that a central line (e.g., straight line connecting centers of the respective mirror surfaces 232a, 232b cut by the X-Y plane as indicted by a dotted line in FIG. 11) in the side-by-side-disposed direction of the roof mirror assembly 233 is inclined at θ to the X-direction. Accordingly, as illustrated in FIG. 11, an area ratio of the mirror surface 232a to the mirror surface 232b is set such as 232a<232b. However, when equalizing an area ratio of a mirror surface 232a' to a mirror surface 232b' (i.e., 232a'=232b'), as shown in FIG. 12, the respective mirror surfaces 232a', 232b' may be disposed to make respective angles of 45°+θ and 45°−θ, taking into consideration the inclined angle θ of the central line in the side-by-side-disposed direction of a roof mirror assembly 233'.

FIG. 13A schematically illustrates a relationship between a side-by-side-disposed direction P2 of the prism group 223 and a side-by-side-disposed direction M2 of the roof mirror assembly 233 in the case of the embodiment illustrated in FIG. 10. Herein, when desiring to get the light beam It' having a polarizing direction of 45° to the X-direction, as illustrated in FIG. 13A, the prism group 223 may be disposed in the side-by-side relationship so that a straight line connecting the centers of ridge lines of the respective prisms faces in the side-by-side-disposed direction P2 (to make an angle of 45° to the X-direction within the X-Z plane (or the plane parallel to the X-Z plane)), and the roof mirror assembly 233 may be disposed so that a straight line connecting the centers of individual crest lines 234a of the roof mirror assembly 233 or a straight line connecting the centers of respective trough lines 234b faces in the side-by-side-disposed direction M2. However, the side-by-side-disposed direction M2 is a direction parallel to the θ-axis within the θ-Z plane (or the plane parallel to the θ-Z plane), wherein an axis having a θ inclination to the X-axis within the X-Y plane is the θ-axis.

Contrasting, when desiring to obtain a rectilinear polarized beam having an oscillating plane parallel to the X-direction, as in the first embodiment illustrated in FIG. 1 by way of an emerging light beam It', as shown in FIG. 13B, the prism group 223 may be disposed in the side-by-side relationship so that the straight line connecting the centers of ridge lines of the respective prisms faces in a side-by-side-disposed direction P3 (the X-direction within the X-Z plane (or the plane parallel to the X-Z plane)), and the roof mirror assembly 233 may be disposed so that the straight line connecting the centers of individual crest lines 234a of the roof mirror assembly 233 or the straight line connecting the centers of respective trough lines 234b faces in a side-by-side-disposed direction M3 (the direction parallel to the axis making 45° to the θ-axis within the θ-Z plane (or the plane parallel to the θ-Z plane)).

As discussed above, in the case of this embodiment also, it is possible to obtain the rectilinear polarized beam having the desired polarizing direction by properly combining the side-by-side-disposed direction of the prism group 223 with the side-by-side-disposed direction of the roof mirror assembly 233.

Next, a light source apparatus 300 in accordance with a third embodiment of the present invention will be discussed with reference to FIGS. 14 and 15.

This light source apparatus 300 is also, as in the preceding first and second embodiments, constructed mainly of a polarizing filter 320, a light reflecting member 330 and a light source unit 340. Note that the polarizing filter 320 in the light source apparatus 300 in the third embodiment incorporates substantially the same function as that explained in FIGS. 4A to 4C, and therefore its explanation will be omitted. Furthermore, note that the light source unit 340 is substantially the same as that explained in FIGS. 6 to 9, and therefore its explanation will be omitted.

Figure 14:
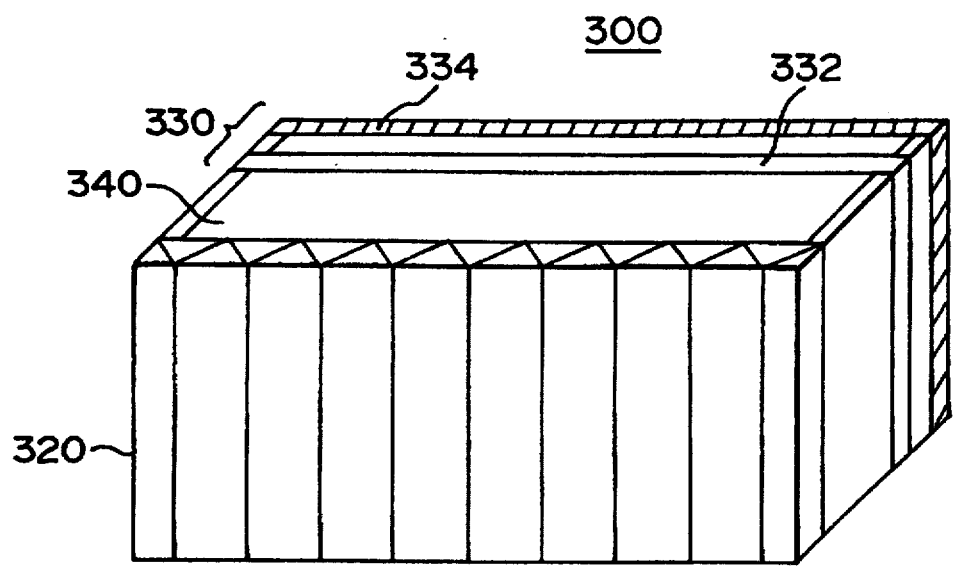
FIG. 14 is a perspective view schematically illustrating a construction of the light source apparatus in the third embodiment of the present invention.

As illustrated in FIG. 14, a difference of the third embodiment from the first embodiment in terms of the construction will be conspicuously seen in a light reflecting member 330. More specifically, in the light source apparatus 100 in the first embodiment, the light reflecting member 130 is constructed as the roof mirror assembly 133, while in the light source apparatus 300 in the third embodiment the light reflecting member 330 is constructed of a λ/4 wavelength plate 332 and a plane mirror 334.

Figure 15:
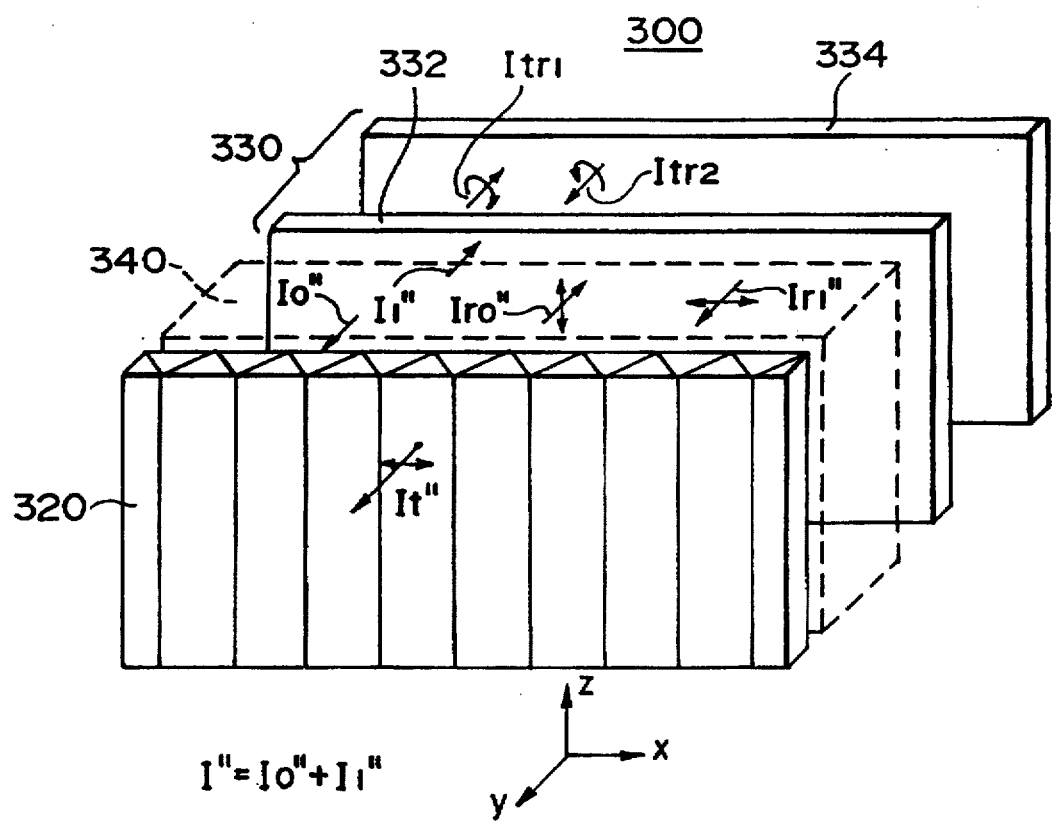
FIG. 15 is a perspective view illustrating the optical paths within the light source apparatus in the third embodiment of the present invention.

As shown in FIG. 15, in this light source apparatus 300, the plane mirror 334, the λ/4 wavelength plate 332, the light source unit 340 and the polarizing filter 320 are sequentially disposed. Accordingly, the component (the first rectilinear polarizing component) having the X-directional polarization plane among light beams I" (I"=I0"+I1") emitted from the light source 340 travels through the polarizing filter 320 and turns out a light beam It". In contrast with this, the component (the second rectilinear polarizing component) having the Z-directional polarizing plane among light beams I0" is reflected from the polarizing filter 320 and turns out a light beam Ir0". The light beam Ir0" passes through the light source 340 and undergoes a phase modulation when penetrating the λ/4 wavelength plate 332, with the result that the beam is converted into a right-turn circularly polarized beam Itr1. The circularly polarized beam Itr1 is reflected by the plane mirror 334 and then converted into a left-turn circularly polarized beam Itr2. Then, the left-turn circularly polarized beam Itr2 again undergoes the phase modulation when passing through the λ/4 wavelength plate 332 and is converted into the rectilinear polarized beam Ir1" (the first rectilinear polarized component) having the X-directional polarization surface. The rectilinear polarized beam Ir1" therefore travels through the polarizing filter 320 and exists outside.

Some embodiments of the light source apparatus according to the present invention have been discussed so far, but the present invention is not limited to such embodiments. For example, in the illustrative embodiments, the apparatus is constructed as the plane light source for forming the rectilinear polarized beam suitable for the back-light for a liquid crystal display and the back-light for a liquid crystal projector. The present invention is not, however, confined to such embodiments. The apparatus is constructed as a light source taking a variety of configurations by properly selecting a configuration of the polarizing filter and is applicable to the medical illumination light, the water tank illumination light, etc..

Therefore, it is intended that the invention not be limited to the preferred embodiments described above, but that the invention will include all embodiments falling within the scope of the appended claims.

What is claimed is:

1. A light source apparatus for emitting rectilinear polarized light beams, comprising:

a light source;

a polarizing filter device which transmits a first rectilinear polarized component of light emitted from said light source but reflects a second rectilinear polarized component of light emitted from said light source; and a light reflecting device which reflects light of said second rectilinear polarized component toward said polarizing filter device and converts a direction of a polarization plane of that light into a direction of a polarization plane of said first rectilinear polarized component, wherein said light reflecting device includes a combination of roof mirrors each having a vertical angle of approximately 90°, and respective crest and trough lines of the combination of said roof mirrors are disposed to make an angle of approximately 45° to a polarizing direction of incident light of said second rectilinear polarized component.

2. A light source apparatus according to claim 1, wherein said polarizing filter device includes a combination of polarizing beam splitters.

3. A light source apparatus according to claim 1, wherein said light source is disposed between said polarizing filter device and said light reflecting device, and near an end of at least one of said polarizing filter device and said light reflecting device, and said light reflecting device is disposed to be skewed relative to said polarizing filter device such that a distance therebetween is minimum at an opposite end of said at least one of said polarizing filter device and said light reflecting device.

4. A light source apparatus according to claim 1, wherein said light source is disposed between said light reflecting device and said polarizing filter device.

* * * * *